(12) United States Patent
Matsuoka (10) Patent No.: US 11,913,531 B1
(45) Date of Patent: Feb. 27, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 0 days.

(21) Appl. No.: 18/349,306

(22) Filed: Jul. 10, 2023

(30) Foreign Application Priority Data

Aug. 9, 2022 (JP) .................................. 2022-126915

(51) Int. Cl.
*F16H 47/06* (2006.01)
*B60K 1/00* (2006.01)
*B60L 15/20* (2006.01)

(52) U.S. Cl.
CPC .............. *F16H 47/06* (2013.01); *B60L 15/20* (2013.01); *B60K 2001/001* (2013.01); *B60L 2240/486* (2013.01); *B60L 2260/20* (2013.01); *F16H 2200/0021* (2013.01); *F16H 2200/0034* (2013.01); *F16H 2200/0082* (2013.01)

(58) Field of Classification Search
CPC ............. F16H 47/06; F16H 2200/0021; F16H 2200/0034; F16H 2200/0082; B60L 15/20; B60L 2240/486; B60L 2260/20; B60K 1/00; B60K 2001/001
See application file for complete search history.

(56) References Cited

U.S. PATENT DOCUMENTS

| 10,293,810 B2* | 5/2019 | Wang ............... B60W 30/18063 |
| 10,744,862 B2* | 8/2020 | Sekiguchi .............. B60K 25/00 |
| 10,974,593 B2* | 4/2021 | Duan ..................... B60W 20/30 |
| 2013/0196817 A1* | 8/2013 | Miyazaki .............. B60W 20/40 903/902 |
| 2023/0135283 A1* | 5/2023 | Matsuoka ............. F16H 63/502 74/730.1 |

FOREIGN PATENT DOCUMENTS

| DE | 102013105731 A1 * | 12/2013 | ............... B60K 6/48 |
| DE | 102019111811 A1 * | 11/2020 | |
| JP | 5370233 B2 | 12/2013 | |

* cited by examiner

*Primary Examiner* — Sherry L Estremsky
(74) *Attorney, Agent, or Firm* — United IP Counselors, LLC (57) ABSTRACT

A drive unit includes an electric motor, a torque converter, a power transmission unit, a first shaft, a second shaft, and a first switching mechanism. The torque converter amplifies torque from the electric motor in a first rotation direction. The power transmission unit includes first and second forward drive gear trains. The first shaft transmits torque from the electric motor to the torque converter. The second shaft transmits torque from the torque converter to the second forward drive gear train. The first switching mechanism transmits torque from the first shaft to the first forward drive gear train in a first forward drive state. The first switching mechanism does not transmit torque from the first shaft to the first forward drive gear train in a first neutral state. The first switching mechanism is configured not to allow the first forward drive gear train to rotate in a locking state.

7 Claims, 6 Drawing Sheets

DRIVE UNIT

CROSS-REFERENCE TO RELATED APPLICATIONS

This application is based on and claims the priority benefit of Japanese application 2022-126915 filed Aug. 9, 2022, the contents of which are incorporated herein by reference.

BACKGROUND OF THE INVENTION

Field of the Invention

The present invention relates to a drive unit.

Description of the Related Art

Electric vehicles include an electric motor as a drive source. An electric vehicle is proposed in which a torque converter is provided in order to amplify torque from the electric motor (e.g., Patent Literature 1).
Patent Literature 1: JP 5370233B

SUMMARY OF THE INVENTION

A vehicle in which a drive unit as described above is installed may move when parked on a hill or the like. In view of this, a problem to be solved by the present invention is to prevent a vehicle from moving while parked.

A drive unit pertaining to a first aspect includes an electric motor, a torque converter, a power transmission unit, a first shaft, a second shaft, and a first switching mechanism. The torque converter is configured to amplify torque in a first rotation direction output from the electric motor. The power transmission unit includes a first forward drive gear train and a second forward drive gear train. The first shaft is configured to transmit torque from the electric motor to the torque converter. The second shaft is configured to be capable of transmitting torque from the torque converter to the second forward drive gear train. The first switching mechanism is configured to switch between a first forward drive state, a first neutral state, and a locking state. The first switching mechanism is configured to transmit torque from the first shaft to the first forward drive gear train in the first forward drive state. The first switching mechanism is configured not to transmit torque from the first shaft to the first forward drive gear train in the first neutral state. The first switching mechanism is configured not to allow the first forward drive gear train to rotate in the locking state.

According to this configuration, the first forward drive gear train cannot rotate when the first switching mechanism is switched to the locking state. Consequently, a vehicle can be prevented from moving while parked.

A drive unit pertaining to a second aspect is the drive unit pertaining to the first aspect further including a second switching mechanism. The power transmission unit includes a reverse drive gear train. The second switching mechanism is configured to switch between a second forward drive state, a reverse drive state, and a second neutral state. The second switching mechanism is configured to transmit torque from the second shaft to the second forward drive gear train in the second forward drive state. The second switching mechanism is configured to transmit torque from the second shaft to the reverse drive gear train in the reverse drive state. The second switching mechanism is configured not to transmit torque from the second shaft in the second neutral state.

A drive unit pertaining to a third aspect is the drive unit pertaining to the second aspect configured as follows. The first forward drive gear train has a smaller reduction ratio than the second forward drive gear train.

A drive unit pertaining to a fourth aspect is the drive unit pertaining to the second or third aspect further including a control unit. The control unit is configured to control the electric motor. The control unit is configured to set the motor characteristics of the electric motor to a high-speed mode upon determining that the first switching mechanism is in the first forward drive state, and set the motor characteristics of the electric motor to a low-speed mode upon determining that the second switching mechanism is in the second forward drive state. In the low-speed mode, the maximum torque is greater and the maximum output is smaller than in the high-speed mode.

A drive unit pertaining to a fifth aspect is the drive unit pertaining to any one of the first to fourth aspects further including a clutch. The clutch is configured to transmit torque between the electric motor and the first shaft in a state in which the transmission of torque can be interrupted.

A drive unit pertaining to a sixth aspect is the drive unit pertaining to any one of the first to fifth aspects configured as follows. The first switching mechanism includes a first torque output portion, a first torque input portion, a stationary portion, and a first coupling portion. The first torque output portion rotates integrally with the first shaft. The first torque input portion rotates integrally with the first forward drive gear train. The stationary portion is disposed non-rotatably. The first coupling portion can assume a first coupling state, a second coupling state, and a first non-coupling state. In the first coupling state, the first coupling portion couples the first torque output portion and the first torque input portion. In the second coupling state, the first coupling portion couples the first torque input portion and the stationary portion. In the first non-coupling state, the first coupling portion assumes neither the first coupling state nor the second coupling state.

A drive unit pertaining to a seventh aspect is the drive unit pertaining to any one of the second to fourth aspects configured as follows. The second switching mechanism includes a second torque output portion, a second torque input portion, a third torque input portion, and a second coupling portion. The second torque output portion rotates integrally with the second shaft. The second torque input portion rotates integrally with the second forward drive gear train. The third torque input portion rotates integrally with the reverse drive gear train. The second coupling portion can assume a third coupling state, a fourth coupling state, and a second non-coupling state. In the third coupling state, the second coupling portion couples the second torque output portion and the second torque input portion. In the fourth coupling state, the second coupling portion couples the second torque output portion and the third torque input portion. In the second non-coupling state, the second coupling portion assumes neither the third coupling state nor the fourth coupling state.

According to the present invention, a vehicle can be prevented from moving while parked.

DESCRIPTION OF EMBODIMENTS

Figure 1:
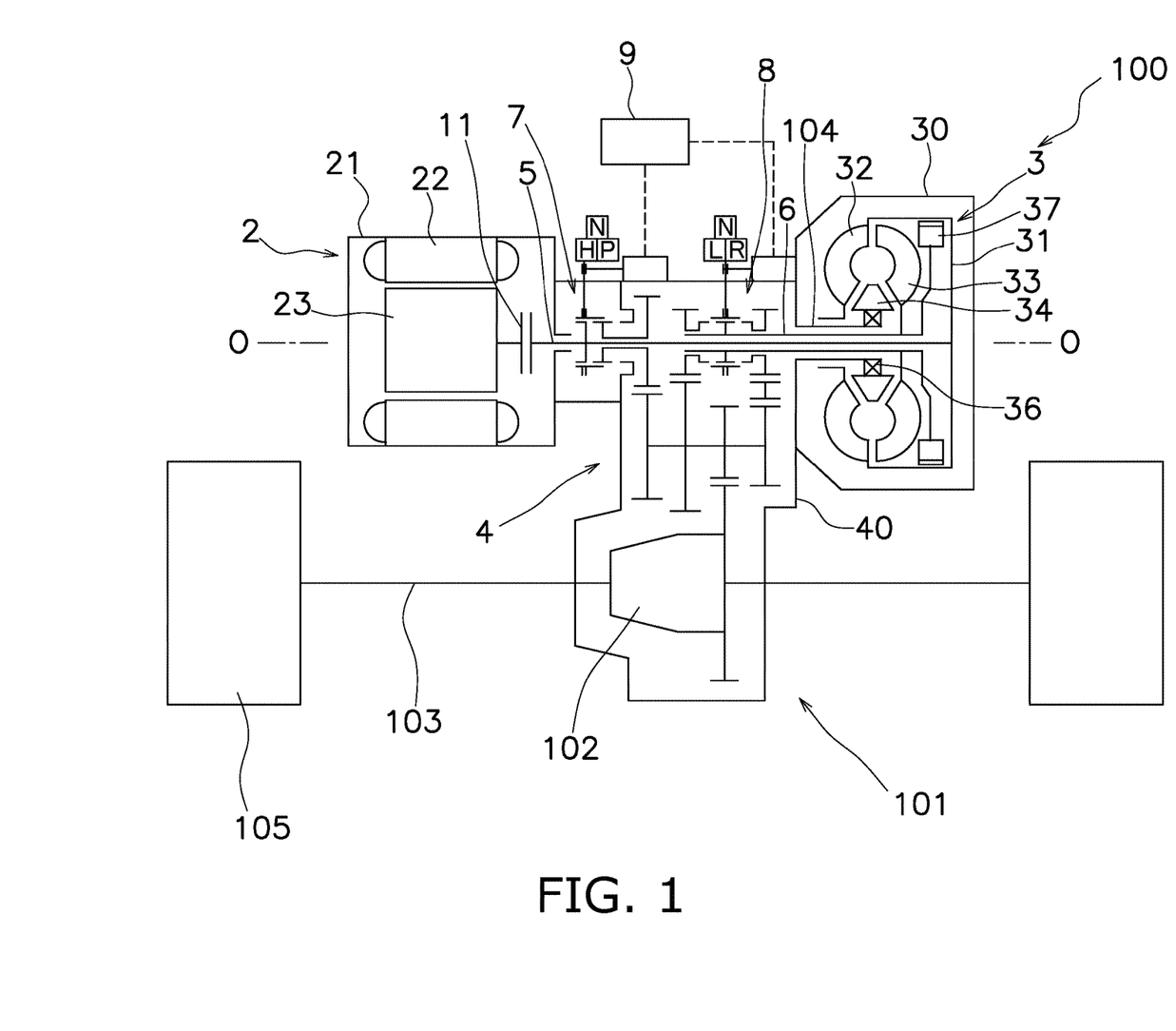
FIG. 1 is a schematic diagram of a drive unit.

In the following, an exemplary embodiment of a drive unit in accordance with the claimed invention will be described with reference to the drawings. FIG. 1 is a schematic diagram of a drive unit 100 pertaining to the present embodiment. Note that in the following description, the axial direction refers to the direction in which a rotation axis O of an electric motor 2 or a torque converter 3 extends. Furthermore, the circumferential direction and the radial direction respectively refer to the circumferential direction and the radial direction of a circle about the rotation axis O. In addition, forward rotation and reverse rotation respectively refer to the rotation when a vehicle moves forward and the rotation when the vehicle moves backward.

[Drive Unit 100]

As illustrated in FIG. 1, the drive unit 100 includes the electric motor 2, the torque converter 3, a power transmission unit 4, a first shaft 5, a second shaft 6, a first switching mechanism 7, a second switching mechanism 8, and a control unit 9. For example, this drive unit 100 is installed in an electric vehicle. The drive unit 100 is configured to drive drive wheels 105.

<Electric Motor 2>

The electric motor 2 includes a motor case 21, a motor stator 22, and a rotor 23. The electric motor 2 in the present embodiment is a so-called inner-rotor motor. The motor case 21 is fixed to a vehicle body frame or the like and cannot rotate. The motor stator 22 and the rotor 23 are housed inside this motor case 21.

The motor stator 22 is fixed to the inner-circumferential surface of the motor case 21. The motor stator 22 cannot rotate. The rotor 23 rotates about a rotation axis O. The rotor 23 is disposed inward of the motor stator 22 in the radial direction. The motor stator 22 is disposed so as to be spaced away from the rotor 23 in the radial direction.

<Torque Converter 3>

The torque converter 3 is disposed so as to be spaced away from the electric motor 2 in the axial direction. The power transmission unit 4 is disposed between this torque converter 3 and the electric motor 2. In the axial direction, the electric motor 2, the power transmission unit 4, and the torque converter 3 are arranged in this order.

The torque converter 3 is disposed rotatably. A rotation axis O of the torque converter 3 substantially coincides with the rotation axis O of the electric motor 2. Torque from the electric motor 2 is transmitted to the torque converter 3. The torque converter 3 is configured to amplify torque in a first rotation direction output from the electric motor 2.

The torque converter 3 includes a cover 31, an impeller 32, a turbine 33, a stator 34, a first one-way clutch 36, and a centrifugal clutch 37. In the present embodiment, the outer shell of the torque converter 3 is formed by the cover 31 and the impeller 32.

In the torque converter 3, the impeller 32 is disposed in the electric motor 2-side (the left side in FIG. 1), and the cover 31 is disposed in the opposite side from the electric motor 2 (the right side in FIG. 1). This torque converter 3 is housed inside a torque converter case 30. A working fluid is supplied to the inside of the torque converter 3. For example, the working fluid is a hydraulic oil.

Torque from the electric motor 2 is input to the cover 31. The cover 31 is rotated by the torque from the electric motor 2. The cover 31 is fixed to the first shaft 5. For example, the cover 31 has a spline hole, and the first shaft 5 is spline-fitted to the spline hole in the cover 31. Thus, the cover 31 rotates integrally with the first shaft 5. The cover 31 is disposed so as to cover the turbine 33.

The impeller 32 rotates integrally with the cover 31. Torque from the electric motor 2 is input to the impeller 32 via the cover 31. The impeller 32 is fixed to the cover 31. The impeller 32 is rotatably supported by a stationary shaft 104 via a bearing member (unillustrated). Note that this stationary shaft 104 is cylindrical. The space between the impeller 32 and the stationary shaft 104 is hermetically sealed. The second shaft 6 extends axially through the interior of the stationary shaft 104. Furthermore, the stationary shaft 104 extends from a power transmission unit case 40 or the torque converter case 30, for example. The stationary shaft 104 cannot rotate.

The turbine 33 is disposed so as to face the impeller 32. Specifically, the turbine 33 faces the impeller 32 in the axial direction. Torque is transmitted to the turbine 33 from the impeller 32 via the working fluid.

The second shaft 6 is attached to the turbine 33. Specifically, the second shaft 6 is spline-fitted to the turbine 33. The turbine 33 rotates integrally with the second shaft 6.

The stator 34 is configured to regulate the flow of the hydraulic oil returning to the impeller 32 from the turbine 33. The stator 34 can rotate about the rotation axis O. For example, the stator 34 is supported by the stationary shaft 104 via the first one-way clutch 36. This stator 34 is disposed between the impeller 32 and the turbine 33 in the axial direction.

The first one-way clutch 36 is disposed between the stationary shaft 104 and the stator 34. The first one-way clutch 36 is configured to allow the stator 34 to rotate in the forward rotation direction. In contrast, the first one-way clutch 36 does not allow the stator 34 to rotate in the reverse rotation direction. Torque is amplified by this stator 34 and transmitted from the impeller 32 to the turbine 33.

The centrifugal clutch 37 is attached to the turbine 33 or the second shaft 6. The centrifugal clutch 37 rotates integrally with the turbine 33. The centrifugal clutch 37 is configured to couple the cover 31 and the turbine 33 by the centrifugal force generated as a result of the turbine 33 rotating. Specifically, the centrifugal clutch 37 is configured to transmit torque from the cover 31 to the turbine 33 once the rotation speed of the turbine 33 becomes more than or equal to a predetermined rotation speed.

<Power Transmission Unit 4>

The power transmission unit 4 is housed inside the power transmission unit case 40. The power transmission unit 4 is disposed between the electric motor 2 and the torque converter 3 in the axial direction. The power transmission unit 4 outputs torque from the torque converter 3 to an output unit 101. The power transmission unit 4 reduces rotation speed and transmits power from the torque converter 3 to the output unit 101. That is, the power transmission unit 4 functions as a reduction gear. Note that the output unit 101 includes a differential gear 102, a pair of drive shafts 103, and the drive wheels 105. Note that the output unit 101 may include only the drive wheels 105.

Figure 2:
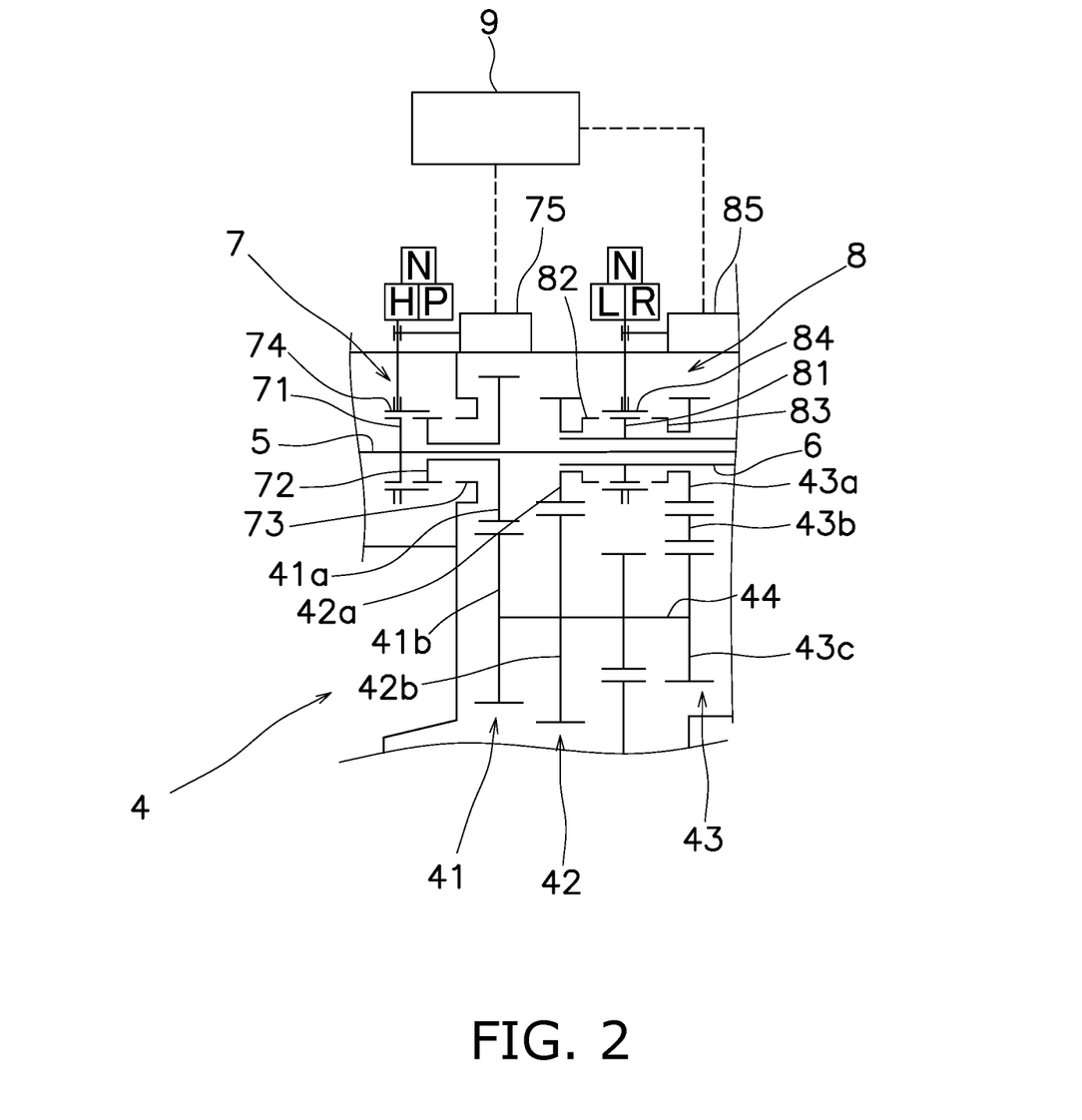
FIG. 2 is an enlarged view of first and second switching mechanisms.

As illustrated in FIG. 2, the power transmission unit 4 includes a first forward drive gear train 41, a second forward drive gear train 42, and a reverse drive gear train 43. The first forward drive gear train 41 transmits torque from the first shaft 5 to the output unit 101. Specifically, the first forward drive gear train 41 is configured to output torque in the first rotation direction output from the electric motor 2 as forward rotation direction torque. In other words, the first forward drive gear train 41 is configured to output torque in a second rotation direction output from the electric motor 2 as reverse rotation direction torque. Thus, the vehicle moves forward when the electric motor 2 is rotated in the first rotation direction and torque is output to the drive wheels 105 via the first forward drive gear train 41. Furthermore, the vehicle moves backward when the electric motor 2 is rotated in the second rotation direction and torque is output to the drive wheels 105 via the first forward drive gear train 41.

The first forward drive gear train 41 includes a first gear 41*a* and a second gear 41*b* that mesh with one another. The first gear 41*a* is relatively rotatably supported by the first shaft 5. The second gear 41*b* is supported by a third shaft 44. The second gear 41*b* rotates integrally with the third shaft 44. The second gear 41*b* outputs torque from the first gear 41*a* to the third shaft 44. Note that the third shaft 44 is disposed rotatably.

The second forward drive gear train 42 transmits torque from the second shaft 6 to the output unit 101. Specifically, the second forward drive gear train 42 is configured to output torque in the first rotation direction output from the electric motor 2 as forward rotation direction torque. Thus, the vehicle moves forward when the electric motor 2 is rotated in the first rotation direction and torque is output to the drive wheels 105 via the second forward drive gear train 42.

The second forward drive gear train 42 includes a third gear 42*a* and a fourth gear 42*b* that mesh with one another. The third gear 42*a* is relatively rotatably supported by the second shaft 6. The fourth gear 42*b* is supported by the third shaft 44. The fourth gear 42*b* rotates integrally with the third shaft 44. The fourth gear 42*b* outputs torque from the third gear 42*a* to the third shaft 44. The second forward drive gear train 42 has a greater reduction ratio than the first forward drive gear train 41.

The reverse drive gear train 43 transmits torque from the second shaft 6 to the output unit 101. Specifically, the reverse drive gear train 43 is configured to output torque in the first rotation direction output from the electric motor 2 as reverse rotation direction torque. Thus, the vehicle moves backward when the electric motor 2 is rotated in the first rotation direction and torque is output to the drive wheels 105 via the reverse drive gear train 43.

The reverse drive gear train 43 includes a fifth gear 43*a*, a sixth gear 43*b*, and a seventh gear 43*c*. The fifth gear 43*a* meshes with the sixth gear 43*b*. Furthermore, the sixth gear 43*b* meshes with the seventh gear 43*c*. The fifth gear 43*a* is relatively rotatably supported by the second shaft 6. The sixth gear 43*b* is supported by a countershaft (unillustrated). The sixth gear 43*b* transmits torque from the fifth gear 43*a* to the seventh gear 43*c*. The seventh gear 43*c* is supported by the third shaft 44. The seventh gear 43*c* rotates integrally with the third shaft 44. The seventh gear 43*c* outputs torque from the sixth gear 43*b* to the third shaft 44.

<First Shaft 5>

As illustrated in FIG. 1, the first shaft 5 extends axially from the electric motor 2. Specifically, the first shaft 5 extends from the rotor 23 of the electric motor 2. Note that, in a case in which the electric motor 2 includes an output shaft, the first shaft 5 is attached to the output shaft of the electric motor 2. The first shaft 5 is disposed rotatably. The rotation axis of the first shaft 5 is substantially collinear with the rotation axis of the electric motor 2 and the rotation axis of the torque converter 3.

The first shaft 5 transmits torque between the electric motor 2 and the torque converter 3. Specifically, the first shaft 5 is configured to transmit torque from the electric motor 2 to the torque converter 3. The first shaft 5 is connected to the impeller 32 of the torque converter 3. Specifically, the first shaft 5 is connected to the impeller 32 via the cover 31. The tip portion of the first shaft 5 is attached to the cover 31 of the torque converter 3.

The first shaft 5 is connected to the electric motor 2 via a clutch 11. This clutch 11 is configured to transmit torque between the first shaft 5 and the electric motor 2 in a state in which the transmission of torque can be interrupted. Specifically, the transmission of torque between the electric motor 2 and the first shaft 5 is interrupted when the clutch 11 is placed in a clutch-off state. In contrast, torque is transmitted between the electric motor 2 and the first shaft 5 when the clutch 11 is placed in a clutch-on state.

<Second Shaft 6>

The second shaft 6 transmits torque between the torque converter 3 and the power transmission unit 4. Specifically, the second shaft 6 can transmit torque from the torque converter 3 to the second forward drive gear train 42. Note that, when the torque transmission path is switched using the later-described second switching mechanism 8, the second shaft 6 can also transmit torque from the torque converter 3 to the reverse drive gear train 43. The second shaft 6 extends axially from the torque converter 3 toward the electric motor 2.

The second shaft 6 is cylindrical. The first shaft 5 extends through the interior of this second shaft 6. Note that the first shaft 5 is solid. One end portion (the right end portion in FIG. 1) of the second shaft 6 is attached to the turbine 33 of the torque converter 3. The second shaft 6 is disposed rotatably. For example, the second shaft 6 is rotatably supported by the power transmission unit case 40 or the like via a bearing member or the like.

<First Switching Mechanism>

Figure 3:
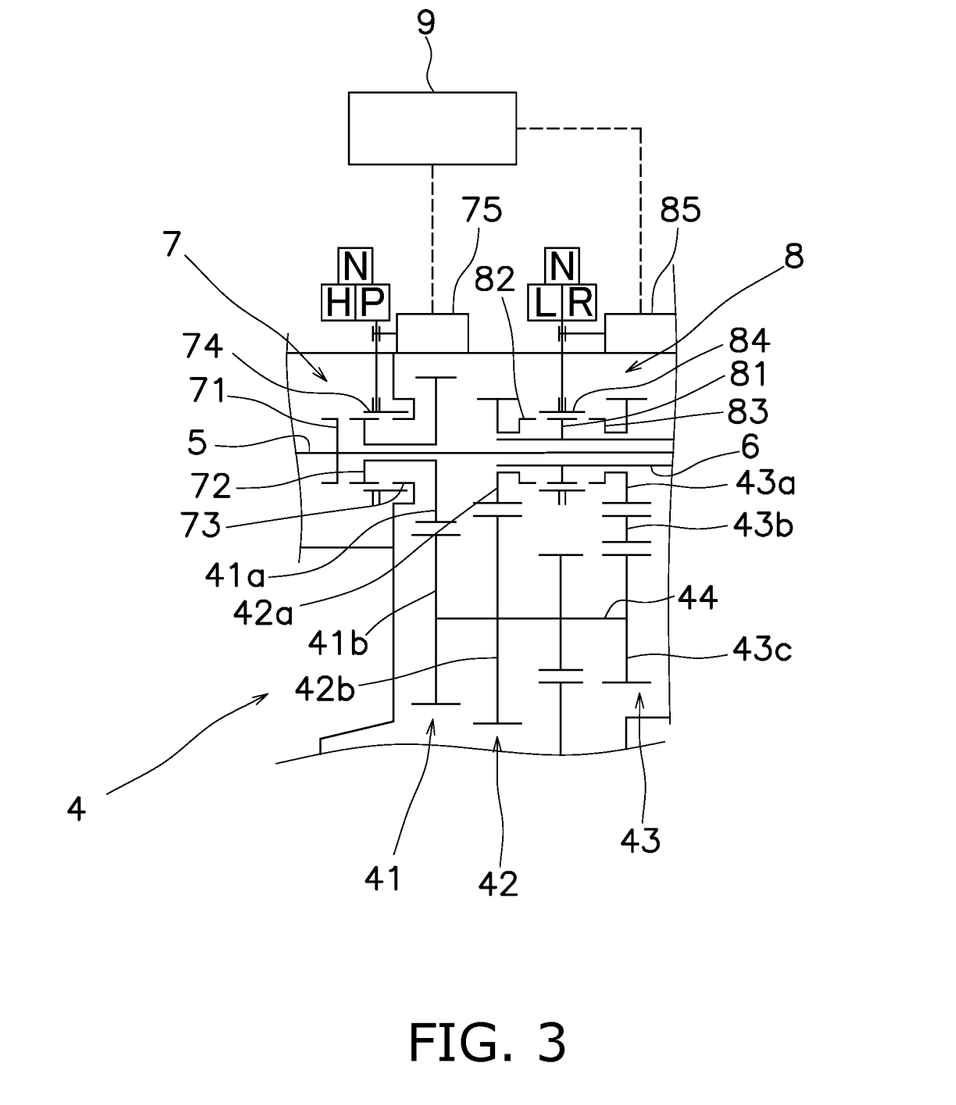
FIG. 3 is an enlarged view of the first and second switching mechanisms.
Figure 4:
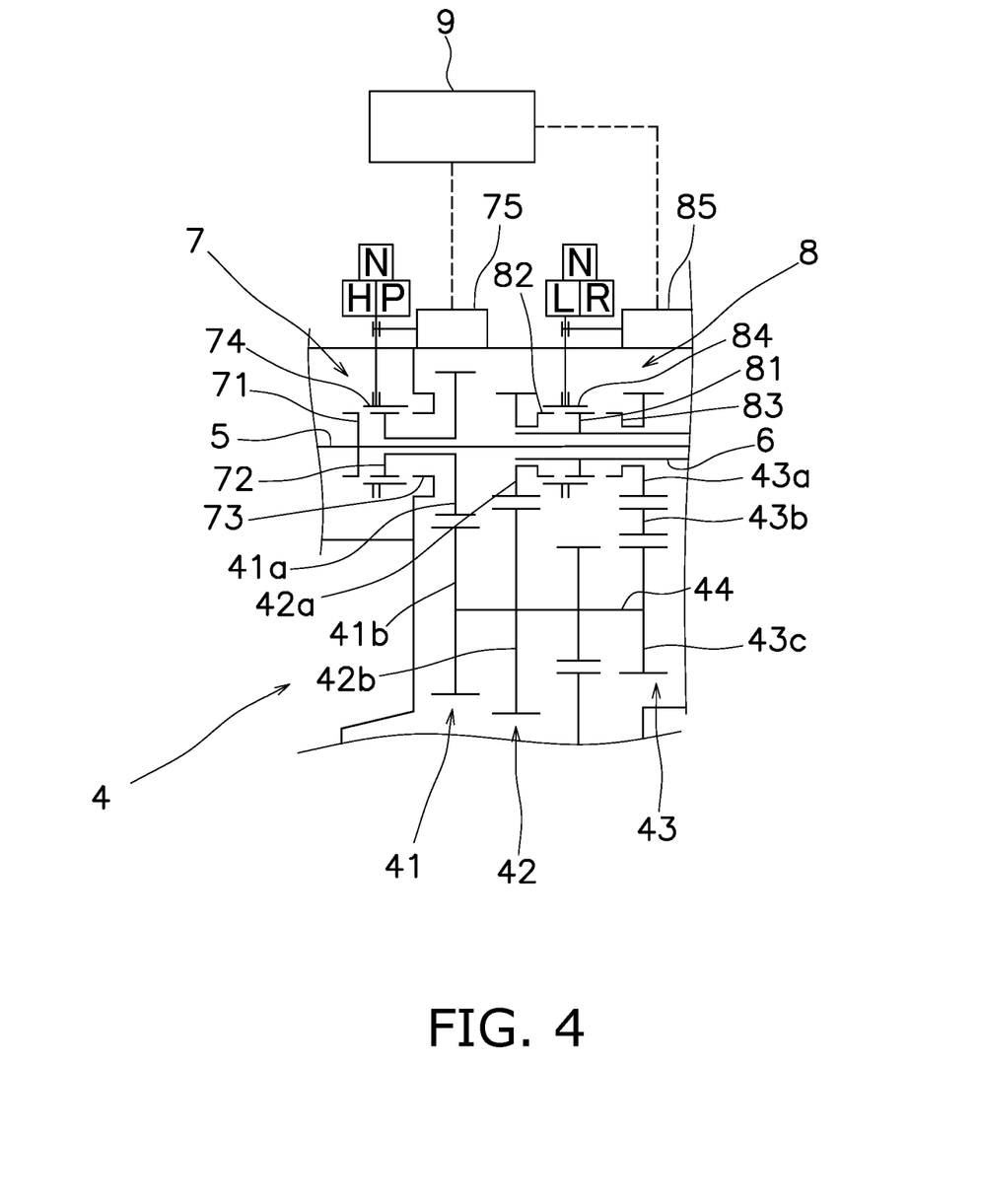
FIG. 4 is an enlarged view of the first and second switching mechanisms.

As illustrated in FIGS. 2 to 4, the first switching mechanism 7 includes a first torque output portion 71, a first torque input portion 72, a stationary portion 73, and a first coupling portion 74. In addition, the first switching mechanism 7 further includes a first actuator 75 that axially moves the first coupling portion 74. The first actuator 75 is controlled by the control unit 9.

The first torque output portion 71 rotates integrally with the first shaft 5. The first torque output portion 71 is a spline that is fixed to the first shaft 5. In other words, the first torque output portion 71 has a plurality of teeth on the outer-circumferential surface thereof. The first torque output portion 71 may be formed using a member that is separate from the first shaft 5, or may be formed integrally with the first shaft 5 using a single member. The first torque output portion 71 is disposed so as to be rotatable about the rotation axis O.

The first torque input portion 72 is disposed so as to be rotatable about the rotation axis O. The first torque input portion 72 has substantially the same outer diameter as the first torque output portion 71. The first torque input portion 72 is a spline. In other words, the first torque input portion 72 has a plurality of teeth on the outer-circumferential surface thereof. The first torque input portion 72 is relatively rotatably supported by the first shaft 5. The first torque input portion 72 is disposed so as to be rotatable relative to the first torque output portion 71.

The first torque input portion 72 rotates integrally with the first forward drive gear train 41. Specifically, the first torque input portion 72 rotates integrally with the first gear 41*a*. The first torque input portion 72 is formed integrally with the first gear 41a. The first torque input portion 72 may be formed together with the first gear 41a using a single member, or may be formed using a separate member.

The stationary portion 73 is a spline. In other words, the stationary portion 73 has a plurality of teeth on the outer-circumferential surface thereof. The stationary portion 73 has substantially the same outer diameter as the first torque input portion 72. The stationary portion 73 is disposed non-rotatably. Specifically, the stationary portion 73 is attached to the power transmission unit case 40. Note that the stationary portion 73 may be formed together with the power transmission unit case 40 using a single member, or may be formed using a separate member.

In the axial direction, the first torque input portion 72 is disposed between the first torque output portion 71 and the stationary portion 73. The first torque output portion 71 and the first torque input portion 72 are adjacent to one another in the axial direction, and the first torque input portion 72 and the stationary portion 73 are adjacent to one another in the axial direction.

The first coupling portion 74 can assume a first coupling state, a second coupling state, and a first non-coupling state. In the first coupling state, the first coupling portion 74 couples the first torque output portion 71 and the first torque input portion 72. In the second coupling state, the first coupling portion 74 couples the first torque input portion 72 and the stationary portion 73. In the first non-coupling state, the first coupling portion 74 assumes neither the first coupling state nor the second coupling state. Specifically, in the first non-coupling state, the first coupling portion 74 meshes with only the first torque input portion 72, and does not mesh with the first torque output portion 71 or the stationary portion 73.

The first coupling portion 74 has a spline hole. In other words, the first coupling portion 74 has a plurality of teeth on the inner-circumferential surface thereof. The first coupling portion 74 always meshes with the first torque input portion 72, and rotates integrally with the first torque input portion 72. The first coupling portion 74 can rotate relative to the first shaft 5.

The first coupling portion 74 is disposed so as to be axially movable. The first coupling portion 74 switches between the first coupling state, the second coupling state, and the first non-coupling state by moving axially. As a result of this, the first switching mechanism 7 switches between a first forward drive state, a locking state, and a first neutral state. Note that, when the first switching mechanism 7 is in the first forward drive state, the later-described second switching mechanism 8 is in a second neutral state.

As illustrated in FIG. 2, when the first switching mechanism 7 is in the first forward drive state, the first coupling portion 74 is in the first coupling state, and couples the first torque output portion 71 and the first torque input portion 72. Specifically, the first coupling portion 74 meshes with the first torque output portion 71, and also meshes with the first torque input portion 72.

As a result of the first coupling portion 74 meshing with the first torque output portion 71 and the first torque input portion 72 as described above, the first torque output portion 71 and the first torque input portion 72 are coupled and rotate integrally. That is, the first shaft 5 and the first gear 41a rotate integrally. When the first switching mechanism 7 is in the first forward drive state as described above, the first switching mechanism 7 transmits torque from the first shaft 5 to the first forward drive gear train 41.

As illustrated in FIG. 3, when the first switching mechanism 7 is in the locking state, the first coupling portion 74 is in the second coupling state, and couples the first torque input portion 72 and the stationary portion 73. Specifically, the first coupling portion 74 meshes with the first torque input portion 72, and also meshes with the stationary portion 73.

As a result of the first coupling portion 74 meshing with the first torque input portion 72 and the stationary portion 73 as described above, the first torque input portion 72 cannot rotate. As a result of this, the first gear 41a and the second gear 41b constituting the first forward drive gear train 41 cannot rotate, and the drive wheels 105 cannot rotate either. In such a manner, when the first switching mechanism 7 is in the locking state, the first switching mechanism 7 does not allow the first forward drive gear train 41 to rotate.

As illustrated in FIG. 4, when the first switching mechanism 7 is in the first neutral state, the first coupling portion 74 is in the first non-coupling state, and meshes with only the first torque input portion 72. In such a manner, as a result of the first coupling portion 74 meshing with only the first torque input portion 72 without meshing with either the first torque output portion 71 or the stationary portion 73, the transmission of torque between the first shaft 5 and the first forward drive gear train 41 can be interrupted. That is, when the first switching mechanism 7 is in the first neutral state, the first switching mechanism 7 does not transmit torque from the first shaft 5 to the first forward drive gear train 41.

The first actuator 75 is configured to move the first coupling portion 74 axially. The first actuator 75 can be formed using a motor or the like.

<Second Switching Mechanism>

Figure 5:
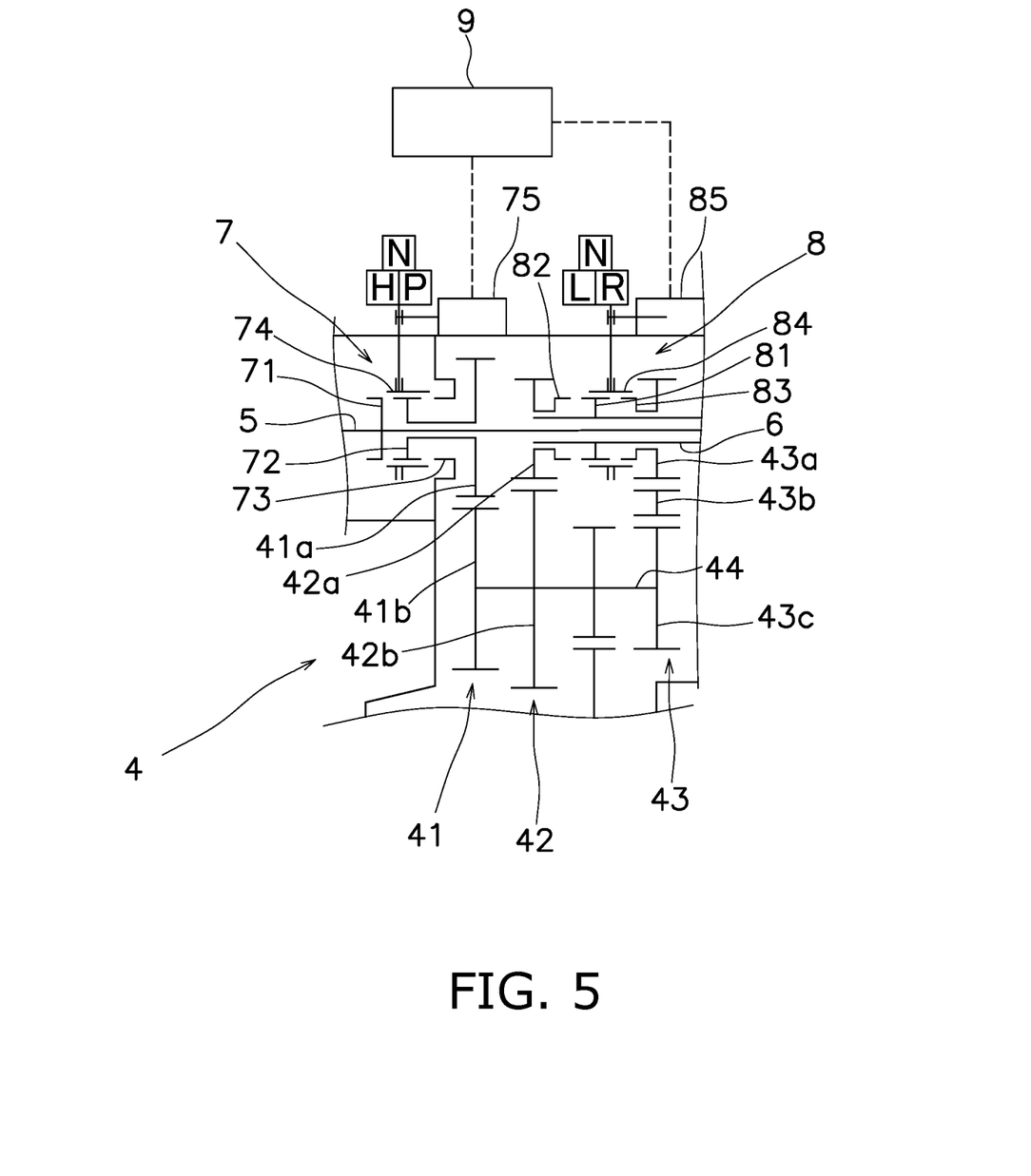
FIG. 5 is an enlarged view of the first and second switching mechanisms.

As illustrated in FIGS. 4 and 5, the second switching mechanism 8 includes a second torque output portion 81, a second torque input portion 82, a third torque input portion 83, and a second coupling portion 84. In addition, the second switching mechanism 8 further includes a second actuator 85 that axially moves the second coupling portion 84. The second actuator 85 is controlled by the control unit 9.

The second torque output portion 81 rotates integrally with the second shaft 6. The second torque output portion 81 is a spline that is fixed to the second shaft 6. In other words, the second torque output portion 81 has a plurality of teeth on the outer-circumferential surface thereof. The second torque output portion 81 may be formed using a member that is separate from the second shaft 6, or may be formed integrally with the second shaft 6 using a single member. The second torque output portion 81 is disposed so as to be rotatable about the rotation axis O.

The second torque input portion 82 is disposed so as to be rotatable about the rotation axis O. The second torque input portion 82 has substantially the same outer diameter as the second torque output portion 81. The second torque input portion 82 is a spline. In other words, the second torque input portion 82 has a plurality of teeth on the outer-circumferential surface thereof. The second torque input portion 82 is relatively rotatably supported by the second shaft 6. The second torque input portion 82 is disposed so as to be rotatable relative to the second torque output portion 81.

The second torque input portion 82 rotates integrally with the second forward drive gear train 42. Specifically, the second torque input portion 82 rotates integrally with the third gear 42a. The second torque input portion 82 is formed integrally with the third gear 42a. The second torque input portion 82 may be formed together with the third gear 42a using a single member, or may be formed using a separate member.

The third torque input portion 83 is disposed so as to be rotatable about the rotation axis O. The third torque input portion 83 has substantially the same outer diameter as the second torque output portion 81. The third torque input portion 83 is a spline. In other words, the third torque input portion 83 has a plurality of teeth on the outer-circumferential surface thereof. The third torque input portion 83 is relatively rotatably supported by the second shaft 6. The third torque input portion 83 is disposed so as to be rotatable relative to the second torque output portion 81.

The third torque input portion 83 rotates integrally with the reverse drive gear train 43. Specifically, the third torque input portion 83 rotates integrally with the fifth gear 43a. The third torque input portion 83 is formed integrally with the fifth gear 43a. The third torque input portion 83 may be formed together with the fifth gear 43a using a single member, or may be formed using a separate member.

In the axial direction, the second torque output portion 81 is disposed between the second torque input portion 82 and the third torque input portion 83. The second torque output portion 81 and the second torque input portion 82 are adjacent to one another in the axial direction, and the second torque output portion 81 and the third torque input portion 83 are adjacent to one another in the axial direction.

The second coupling portion 84 can assume a third coupling state, a fourth coupling state, and a second non-coupling state. In the third coupling state, the second coupling portion 84 couples the second torque output portion 81 and the second torque input portion 82. In the fourth coupling state, the second coupling portion 84 couples the second torque output portion 81 and the third torque input portion 83. In the second non-coupling state, the second coupling portion 84 assumes neither the third coupling state nor the fourth coupling state. Specifically, in the second non-coupling state, the second coupling portion 84 meshes with only the second torque output portion 81, and does not mesh with the second torque input portion 82 or the third torque input portion 83.

The second coupling portion 84 has a spline hole. In other words, the second coupling portion 84 has a plurality of teeth on the inner-circumferential surface thereof. The second coupling portion 84 always meshes with the second torque output portion 81, and rotates integrally with the second torque output portion 81.

The second coupling portion 84 is disposed so as to be axially movable. The second coupling portion 84 switches between the third coupling state, the fourth coupling state, and the second non-coupling state by moving axially. As a result of this, the second switching mechanism 8 switches between a second forward drive state, a reverse drive state, and a second neutral state. Note that, when the second switching mechanism 8 is in the second forward drive state or the reverse drive state, the first switching mechanism 7 is in the first neutral state.

As illustrated in FIG. 4, when the second switching mechanism 8 is in the second forward drive state, the second coupling portion 84 is in the third coupling state, and couples the second torque output portion 81 and the second torque input portion 82. Specifically, the second coupling portion 84 meshes with the second torque output portion 81, and also meshes with the second torque input portion 82.

As a result of the second coupling portion 84 meshing with the second torque output portion 81 and the second torque input portion 82 as described above, the second torque output portion 81 and the second torque input portion 82 are coupled and rotate integrally. That is, the second shaft 6 and the third gear 42a rotate integrally. When the second switching mechanism 8 is in the second forward drive state as described above, the second switching mechanism 8 transmits torque from the second shaft 6 to the second forward drive gear train 42.

As illustrated in FIG. 5, when the second switching mechanism 8 is in the reverse drive state, the second coupling portion 84 is in the fourth coupling state, and couples the second torque output portion 81 and the third torque input portion 83. Specifically, the second coupling portion 84 meshes with the second torque output portion 81, and also meshes with the third torque input portion 83.

As a result of the second coupling portion 84 meshing with the second torque output portion 81 and the third torque input portion 83 as described above, the second torque output portion 81 and the third torque input portion 83 are coupled and rotate integrally. That is, the second shaft 6 and the fifth gear 43a rotate integrally. When the second switching mechanism 8 is in the reverse drive state as described above, the second switching mechanism 8 transmits torque from the second shaft 6 to the reverse drive gear train 43.

As illustrated in FIG. 2 or 3, when the second switching mechanism 8 is in the second neutral state, the second coupling portion 84 is in the second non-coupling state, and meshes with only the second torque output portion 81. In such a manner, as a result of the second coupling portion 84 meshing with only the second torque output portion 81 without meshing with either the second torque input portion 82 or the third torque input portion 83, the transmission of torque between the second shaft 6 and each of the second forward drive gear train 42 and the reverse drive gear train 43 can be interrupted. That is, when the second switching mechanism 8 is in the second neutral state, the second switching mechanism 8 does not transmit torque from the second shaft 6 to either the second forward drive gear train 42 or the reverse drive gear train 43.

The second actuator 85 is configured to move the second coupling portion 84 axially. The second actuator 85 can be formed using a motor or the like.

<Control Unit>

The control unit 9 moves the first coupling portion 74 axially by controlling the first actuator 75. Furthermore, the control unit 9 moves the second coupling portion 84 axially by controlling the second actuator 85.

The control unit 9 is configured to control the electric motor 2. Specifically, the control unit 9 switches the characteristics of the electric motor 2 between a high-speed mode and a low-speed mode in accordance with the state of the drive unit 100.

Figure 6:
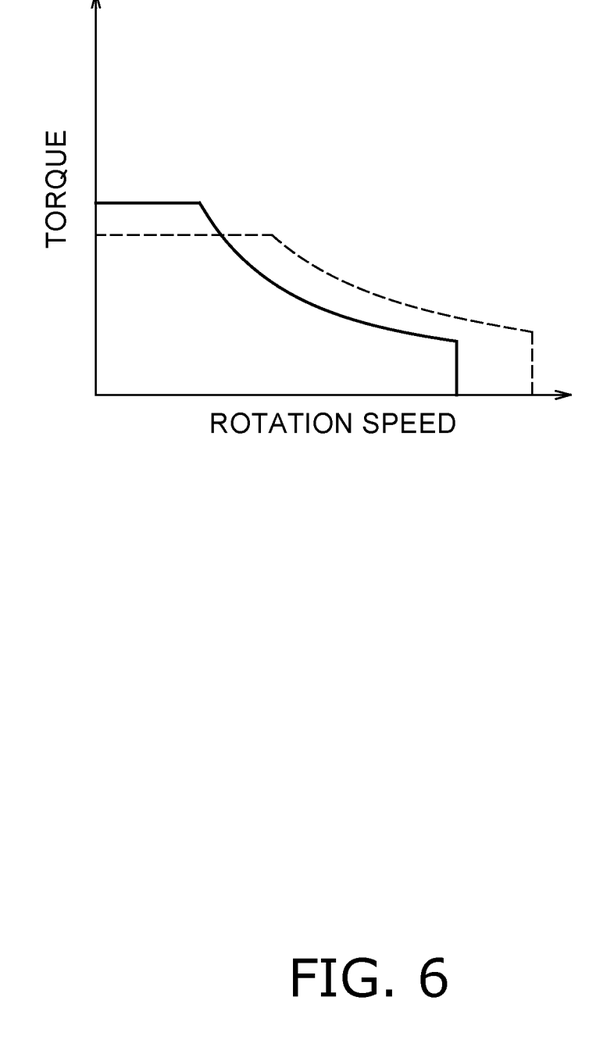
FIG. 6 is a graph illustrating electric motor characteristics.

FIG. 6 is a graph illustrating the characteristics of the electric motor 2. In FIG. 6, the solid line indicates the low-speed mode, and the broken line indicates the high-speed mode. In the low-speed mode, the maximum torque is greater and the maximum output is smaller than in the high-speed mode, as illustrated in FIG. 6. In the high-speed mode, the maximum output is greater and the maximum torque is smaller than in the low-speed mode. Furthermore, in the high-speed mode, the maximum rotation speed is higher than in the low-speed mode.

The control unit 9 acquires, from position sensors or the like, position information relating to the position of the first coupling portion 74 of the first switching mechanism 7, and position information relating to the position of the second coupling portion 84 of the second switching mechanism 8. Furthermore, the control unit 9 sets the motor characteristics of the electric motor 2 to the high-speed mode upon determining that the first switching mechanism 7 is in the first forward drive state based on the position information. In contrast, the control unit 9 sets the motor characteristics of the electric motor 2 to the low-speed mode upon determining that the second switching mechanism 8 is in the second forward drive state.

[Modifications]

While an embodiment of the present invention has been described up to this point, the present invention is not limited to the embodiment, and various modifications can be made within the scope of the present invention. Note that the following modifications can basically be applied simultaneously.

(a) In the above-described embodiment, the drive unit 100 includes the clutch 11. However, the configuration of the drive unit 100 is not limited to this. In other words, the drive unit 100 need not include the clutch 11.

(b) In the above-described embodiment, the control unit 9 is configured to switch the characteristics of the electric motor 2 between the high-speed mode and the low-speed mode. However, the configuration of the control unit 9 is not limited to this. For example, the control unit 9 need not switch the characteristics of the electric motor 2.

(c) In the above-described embodiment, the power transmission unit 4 includes the reverse drive gear train 43. However, the configuration of the power transmission unit 4 is not limited to this. For example, the power transmission unit 4 need not include the reverse drive gear train 43. In this case, the vehicle is moved backward by rotating the electric motor 2 in the second rotation direction and transmitting torque via the first forward drive gear train 41.

(d) In the above-described embodiment, the first coupling portion 74 meshes with only the first torque input portion 72 in the first non-coupling state. However, the configuration of the first coupling portion 74 is not limited to this. For example, in the first non-coupling state, the first coupling portion 74 may mesh with only the first torque output portion 71 or only the stationary portion 73.

(e) In the above-described embodiment, the second coupling portion 84 meshes with only the second torque output portion 81 in the second non-coupling state. However, the configuration of the second coupling portion 84 is not limited to this. For example, in the second non-coupling state, the second coupling portion 84 may mesh with only the second torque input portion 82 or only the third torque input portion 83.

LIST OF REFERENCE NUMERALS

2 Electric motor
3 Torque converter
4 Power transmission unit
41 First forward drive gear train
42 Second forward drive gear train
43 Reverse drive gear train
5 First shaft
6 Second shaft
7 First switching mechanism
71 First torque output portion
72 First torque input portion
73 Stationary portion
74 First coupling portion
8 Second switching mechanism
81 Second torque output portion
82 Second torque input portion
83 Third torque input portion
84 Second coupling portion
9 Control unit
11 Clutch
100 Drive unit

What is claimed is:

1. A drive unit, comprising:
an electric motor;
a torque converter configured to amplify torque in a first rotation direction output from the electric motor;
a power transmission unit including a first forward drive gear train and a second forward drive gear train;
a first shaft configured to transmit torque from the electric motor to the torque converter;
a second shaft configured to be capable of transmitting torque from the torque converter to the second forward drive gear train; and
a first switching mechanism configured to switch between a first forward drive state, a first neutral state, and a locking state,
wherein the first switching mechanism is configured to transmit torque from the first shaft to the first forward drive gear train in the first forward drive state,
the first switching mechanism is configured not to transmit torque from the first shaft to the first forward drive gear train in the first neutral state, and
the first switching mechanism is configured not to allow the first forward drive gear train to rotate in the locking state.

2. The drive unit according to claim 1, further comprising a second switching mechanism,
wherein the power transmission unit includes a reverse drive gear train,
the second switching mechanism is configured to switch between a second forward drive state, a reverse drive state, and a second neutral state,
the second switching mechanism is configured to transmit torque from the second shaft to the second forward drive gear train in the second forward drive state,
the second switching mechanism is configured to transmit torque from the second shaft to the reverse drive gear train in the reverse drive state, and
the second switching mechanism is configured not to transmit torque from the second shaft in the second neutral state.

3. The dive unit according to claim 2, wherein the first forward drive gear train has a smaller reduction ratio than the second forward drive gear train.

4. A drive unit according to claim 2, further comprising a control unit configured to control the electric motor,
wherein the control unit is configured to set the motor characteristics of the electric motor to a high-speed mode upon determining that the first switching mechanism is in the first forward drive state, and
the control unit is configured to set the motor characteristics of the electric motor to a low-speed mode upon determining that the second switching mechanism is in the second forward drive state, the maximum torque being greater and the maximum output being smaller in the low-speed mode than in the high-speed mode.

5. The drive unit according to claim 2, wherein the second switching mechanism includes
a second torque output portion configured to rotate integrally with the second shaft;
a second torque input portion configured to rotate integrally with the second forward drive gear train;
a third torque input portion configured to rotate integrally with the reverse drive gear train; and a second coupling portion that can assume a third coupling state, a fourth coupling state, and a second non-coupling state, wherein the second coupling portion couples the second torque output portion and the second torque input portion in the third coupling state; the second coupling portion couples the second torque output portion and the third torque input portion in the fourth coupling state; and the second coupling portion assumes neither the third coupling state nor the fourth coupling state in the second non-coupling state.

6. The drive unit according to claim 1, further comprising a clutch configured to transmit torque between the electric motor and the first shaft in a state in which the transmission of torque can be interrupted.

7. The drive unit according to claim 1, wherein the first switching mechanism includes a first torque output portion configured to rotate integrally with the first shaft;

a first torque input portion configured to rotate integrally with the first forward drive gear train;

a stationary portion disposed non-rotatably; and a first coupling portion that can assume a first coupling state, a second coupling state, and a first non-coupling state, wherein the first coupling portion couples the first torque output portion and the first torque input portion in the first coupling state; the first coupling portion couples the first torque input portion and the stationary portion in the second coupling state; and the first coupling portion assumes neither the first coupling state nor the second coupling state in the first non-coupling state.

* * * * *